Patented Mar. 5, 1929.

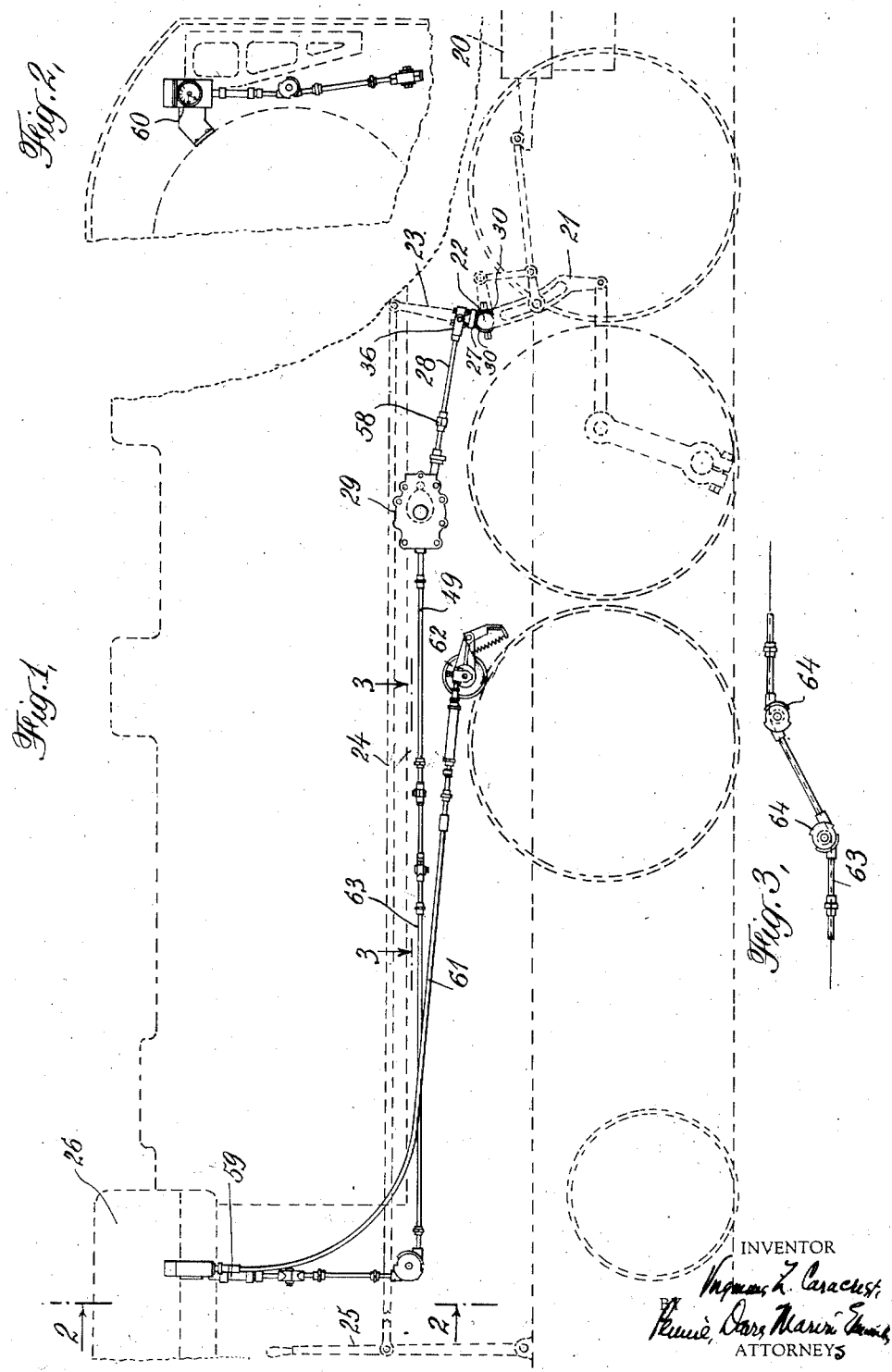

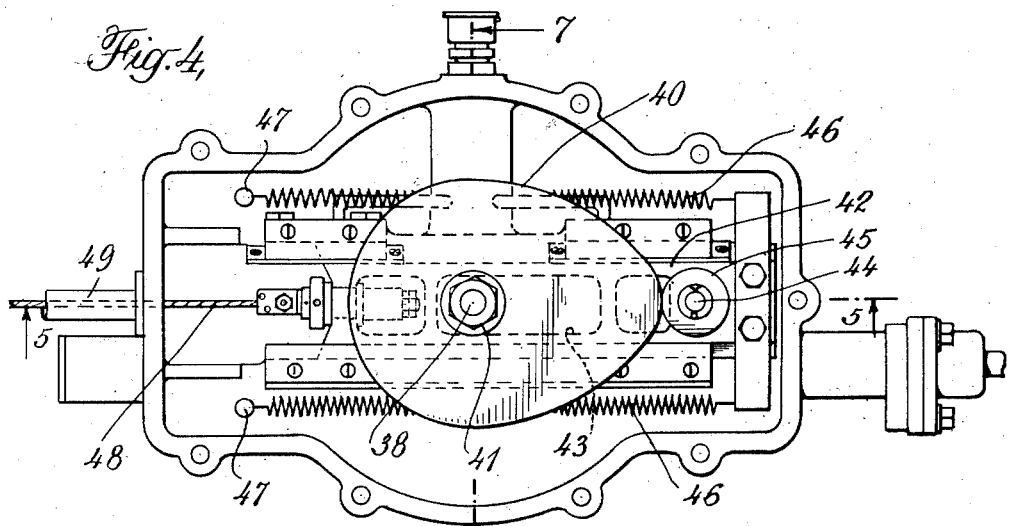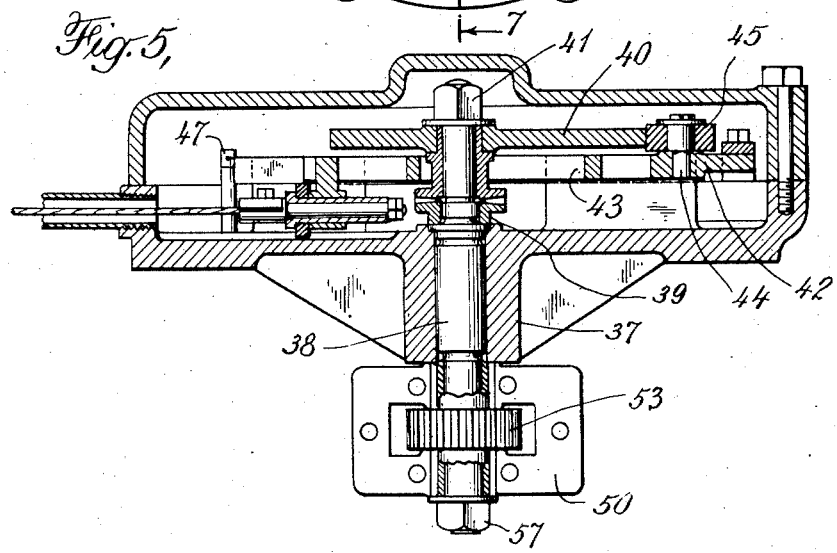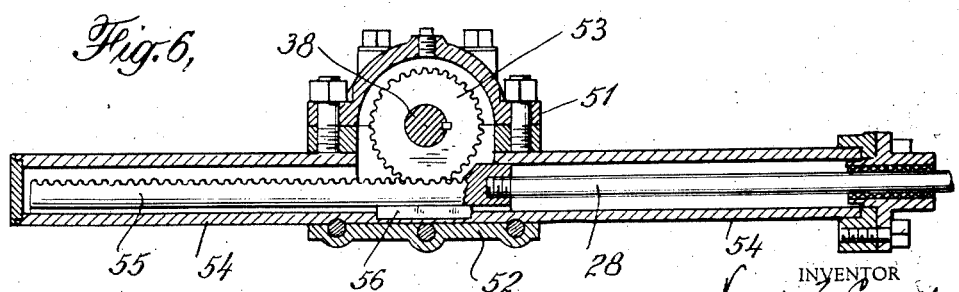

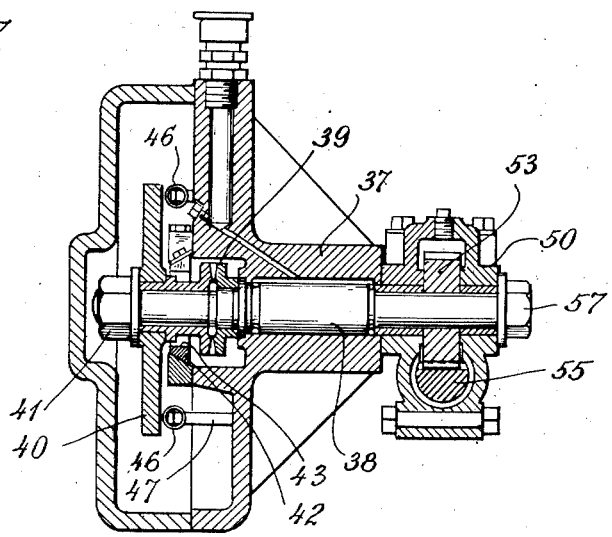
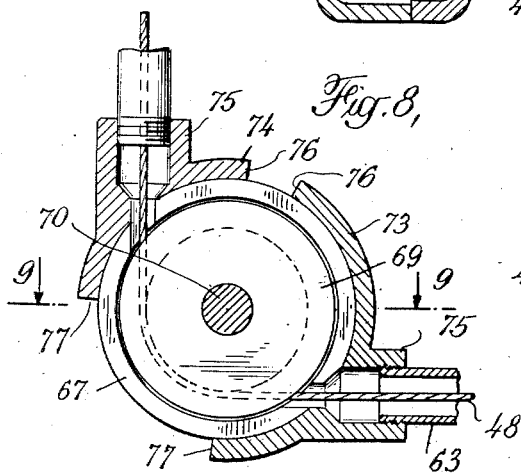
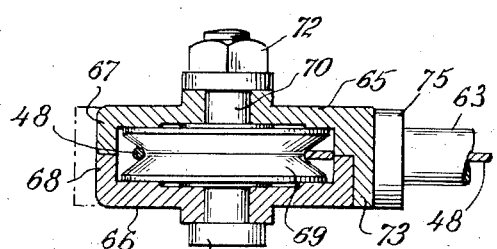
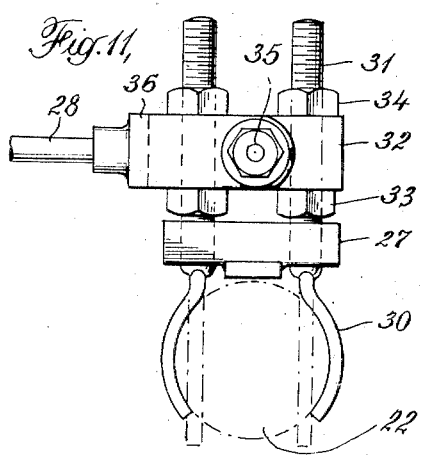

1,704,381

UNITED STATES PATENT OFFICE.

VIRGINIUS Z. CARACRISTI, OF BRONXVILLE, NEW YORK

DEVICE FOR CONTROLLING STEAM-ENGINE OPERATION

Application filed September 13, 1927. Serial No. 219,248.

This invention relates to the art of steam engine operation and is concerned more particularly with apparatus by which the cut-off of a steam engine may be controlled so as to produce maximum work throughout the range of speed of the engine. More specifically, the invention comprises apparatus for indicating to the engineer a result produced by converting into a single expression all the factors governing cut-off, including those values of cut-off which produce maximum work at different speeds of rotation of the engine shaft. With this apparatus may be combined mechanism for indicating the speed of rotation of the engine shaft, whereby the engineer, by comparing the two indications, may adjust the cut-off to secure the maximum result. The apparatus is of particular utility in the operation of steam locomotives in which event the apparatus gives an indication of the surface speed and an indication in terms of surface speed units resulting from the conversion of the factors governing cut-off. The utility of the invention is by no means limited to this particular application, however, which will merely be described for purposes of illustration.

In the operation of steam locomotives, it is well known that in order to produce maximum work, position of cut-off with reference to piston stroke must be varied in accordance with the speed of the piston. In the case of locomotives, this piston speed is directly proportional to the speed of the locomotive, and an instrument indicating surface speed could be modified so as to give indications in terms of speed of piston travel. Such an instrument as this, however, would not be sufficient to indicate to the engineer the position of cut-off to produce maximum draw bar pull because the engineer, while knowing the different rates of piston speed, would have to bear in mind what cut-off would produce the greatest work at the several piston speeds, and would have to make this mental computation before adjusting the cut-off valve to secure the best result.

In order to overcome these difficulties, I have devised an instrument which is described in my Patent No. 1,627,076, granted May 3, 1927, by which all of the factors governing cut-off, including those values of cut-off which produce maximum result at different speeds, are converted into a single expression, and with this apparatus is combined a speed indicating mechanism. The apparatus includes a pair of needles movable preferably over a common scale, one of these needles giving the converted reading based on the various factors governing cut-off and being actuated by a connection through the tumbling shaft to the reverse lever. With this apparatus, as the reverse lever is moved, the needle actuated by it takes a corresponding position on the dial and this needle should be placed in a position corresponding to the position of the speed needle on that dial, since both needles read in similar units. Consequently with the apparatus of the patent it is a simple matter for the engineer to regulate cut-off to secure maximum work since it is only necessary for him to adjust the reverse lever so that the needle actuated by it lies in line-in-line position with the needle indicating speed. When the reverse lever is adjusted to the position referred to, the cut-off is appropriate for securing the best result at that particular surface speed.

The apparatus of the present invention, while including many features of the apparatus illustrated in the patent, differs therefrom in including improved operating means for the cut-off indicating needle by which a better connection may be made between the needle and the tumbling shaft. This connection is simpler than that illustrated and described in my prior patent, whereby the cost of the apparatus is reduced, and it is also simpler to install, so that the improved apparatus may be readily placed in position on a locomotive without requiring that the locomotive be put out of service. In addition, my improved apparatus includes new connections between the needle and the actuating mechanism therefor and various other improvements in construction which will be made apparent from a consideration of the detailed description to follow.

For a better understanding of the invention, reference may be had to the accompanying drawings, in which Fig. 1 is a view largely conventional showing the installation of the improved apparatus, Fig. 2 is a view illustrating the installation of the instrument in the locomotive cab taken on the line 2—2 of Fig. 1, Fig. 3 is a fragmentary plan view on the line 3—3 of Fig. 1, Fig. 4 is a face view of the cam housing forming a part of the apparatus with the cover plate removed, Fig. 5 is a sectional view on the line 5—5 of Fig. 4, Fig. 6 is a transverse sectional view through the rack and pinion driving connection for the cam within the housing, Fig. 7 is a sectional view on the line 7—7 of Fig. 4, Fig. 8 is a sectional view of a cable guide used in the improved apparatus, Fig. 9 is a sectional view on the line 9—9 of Fig. 8, Fig. 10 is a face view of this cable guide, and Fig. 11 is a view illustrating the means for connecting the rack to the tumbling shaft of the locomotive.

Referring now to Fig. 1, the apparatus is shown installed on a locomotive of any standard type, this locomotive having a cut-off valve 20 actuated by operating gear 21. Secured to the tumbling shaft 22 is an arm 23 connected by a rod 24 to the reverse lever 25 in the cab 26.

Fast on the tumbling shaft is a block 27 to which is connected a rod 28 extending from the block to the housing 29 for various parts of the mechanism. The block 27 is illustrated in Fig. 11, and includes a pair of arms 30 which may be bent partially to encircle the tumbling shaft and are then welded thereto in proper position in any desired manner. Attached to the block 27 are upwardly extending posts 31 on which is mounted another block 32. This block 32 is secured in adjusted position by means of nuts 33, 34, and when in proper position the posts are cut and the nuts preferably spot-welded to the block to prevent the block from moving from fixed position. The block 32 carries a stud 35 and is straddled by a forked member 36 the legs of the fork being pivotally mounted on the stud 35 and secured thereon in desired position by lock nuts. The rod 28 is connected to the forked member 36 at one end.

The housing 29 has a boss 37 extending from its rear face, and extending through this boss and into the housing is a shaft 38. A sleeve 39 is mounted on this shaft within the housing for rotation with the shaft and on the sleeve is disposed a cam 40. The cam is held in position by means of a nut 41 threaded on the end of the shaft within the housing. Disposed in suitable guides within the housing is a slide 42, this slide being slotted as at 43 with the shaft 38 projecting through the slot. At one end the slide carries a stud 44 on which is a roller 45 bearing against the face of the cam 40 and springs 46 attached to the slide and to fixed pins 47 within the housing tend to force the slide in a direction such that the roller is forced against the face of the cam. Attached to the slide at the end opposite to that on which the roller is mounted is a cable 48 which passes through an opening in the wall of the housing and into a conduit 49. With the arrangement described, it will be apparent that as the cam is rocked on its axis, the slide will occupy different positions of rest, determined by the engagement of the roller with the cam, and consequently by the contour of the cam.

Projecting beyond the boss 37, the shaft 38 enters a casing 50 made up of upper and lower parts 51, 52. Within the casing 50 there is a pinion 53 mounted on the shaft, and the lower part 52 of the casing includes an extended portion 54 in which lies a rack 55 meshing with the pinion. This rack is held in engagement with the pinion by means of a guide plate 56. The rod 28 attached to the block 32 extends through an opening in the end of the portion 54 and is connected to one end of the rack 55. The casing 50 is held in place against the end of the boss 37 by means of a nut 57 threaded on the end of shaft 38, and the arrangement is such that the casing may move freely with respect to the housing, so that it will assume different positions determined by the position of the rod 28 connected to the tumbling shaft. As this shaft is rocked through its path of travel, the rod is swung slightly in a plane at right angles to the axis of the shaft 38. The casing 50 is free to swing to the necessary extent in the same plane, so that it automatically adjusts itself to the desired position required by the position of the rod. The movement of the rod thus does not cause a binding of the parts. As the housing 29 may be mounted at different points on the locomotive, and at different positions relative to the tumbling shaft, the adjustment of the casing 50 permits the connection between the rack and the tumbling shaft to be placed at any desired angle with reference to the housing. The rod 28 preferably includes a turn buckle 58 so that the length of the rod may be adjusted to particular conditions encountered in the locomotive in which the apparatus is to be used.

With the arrangement described, it will be apparent that upon operation of the reverse lever the movement of the tumbling shaft will cause the block 27 to swing about the tumbling shaft as an axis, and in such movement the block will cause a movement of the rack 55 through the connection 28. This rectilinear movement of the rack causes a movement of rotation of the pinion, which in turn causes a movement of the cam and the position assumed by the cam will determine the position of rest of the plate 42. In the average locomotive the tumbling shaft has a throw of approximately 30° in each direction, whereas it is desirable that the indicating needle should have a movement of 90° or more. Accordingly, the rack and pinion are arranged to multiply the movement of the tumbling shaft to bring about a movement of the cam to the desired extent.

The cable 48 leads through the conduit 49 to the cab of the locomotive wherein is placed the instrument 59 which includes a scale 60 provided with a pair of needles. The instrument 59 includes speed indicating mechanism driven by means of a flexible cable in the conduit 61 leading to a driving wheel 62 mounted on the tread of one of the locomotive driving wheels. This speed indicating needle consequently indicates surface speed in the desired units. The instrument 59 also contains a needle movable over the same scale 60 and actuated by the cable 48, this needle assuming different positions of rest determined by the position of rest of the cam 42 in the housing 29.

In order that the cable 48 may run freely through the conduit in spite of the fact that this conduit includes a number of bends, I have provided cable guides which may be placed at different points in the conduit and permit changes in direction in the cable movement. For example in the horizontal portion of the conduit designated 63 and leading from the housing 29 to the cab, it may be necessary to have a pair of bends, as illustrated in Fig. 3, and where such bends are required I employ guides 64 illustrated in detail in Figs. 8 to 10, inclusive.

Each guide comprises a pair of members 65 and 66. The member 65 includes a disc-like face portion and an edge flange 67, while the member 66 has a similar face portion and a flange 68. The flanges on the two members cooperate to form an enclosed housing within which is a curved pulley or sheave 69, this pulley being mounted on a pin 70 having a head 71 at one end and having threaded thereon a nut 72 at the other end. The two housing members of the guide are thus held in position by means of the pin which also serves as a journal for the pulley.

The member 65 has a portion 73 of its flange which overlies part of the flange 68 on the member 66 and the member 66 has a similar flanged portion 74 which overlies the flange on the member 65. On each of the overlying portions 73 and 74 is formed a boss 75 having an opening for the passage therethrough of the cable 48. The overlying portions 73 and 74 of the two parts of the guide together comprise less than a complete circle so that the halves of the guide may be assembled in different positions of adjustment, thus permitting a variation in the angle made by the two bosses 75. As shown in Fig. 8, the parts of the guide are assembled so that the bosses 75 extend at right angles to each other so that the cable 48 passing around the guide makes a 90° turn. By adjusting the members 65 and 66 until the ends 76 of their overlying flanged portions are in contact, the angle between the axes of the bosses is somewhat lessened so that the cable passing around the guide turns back slightly upon itself. Similarly, the two members 65 and 66 may be adjusted until the other ends 77 of their flanged portions are in contact, in which event the cable will be turned through less than 90° in passing through the guide. Such an adjustment is illustrated in Fig. 3 and the two parts of the guide may be assembled in any desired intermediate position with reference to each other, thus affording a wide range of angles through which the cable may be turned.

It will be seen that the new apparatus is of simple construction and easily installed on different types of locomotives. In the installation of the apparatus the housing 29 is placed on the right side of the locomotive as far out from the center line as clearance for the parts will permit. With the tumbling shaft in position to place the right hand cylinder valves on true center, regardless of the position of the reverse lever, the straps 30 on the block 27 are bent to encircle the tumbling shaft and the block is shifted about the tumbling shaft until the center line through the stud 35 and the tumbling shaft makes an angle of 90° with the center line through the rod 28. With the parts in this position, the straps 30 are welded to the shaft. The casing 50 enclosing the pinion 53 and the rack 55 is capable of a slight movement to compensate for the angular displacement of the rod 28 as the tumbling shaft is moved to different positions of adjustment. Thus, when the parts are in operative position the tumbling shaft is free to be moved throughout its ordinary normal path of travel and at the same time the operative connection between the rack and pinion is maintained without binding. The rack and pinion are always protected from dirt and injury and may readily be maintained in well-lubricated condition.

The cable guide for the cable leading from the slide in the housing to the movable needle within the cab may have as many turns and off-set portions as are required by local conditions. In order that the cable may move freely it is necessary to provide guides for supporting the cable wherever such a turn is encountered, and the new guides which are illustrated herein afford convenient means for guiding the cable through any desired angle normally required. In the construction illustrated, the instrument in which the new movable needle is mounted is shown positioned at the right-hand side of the cab with the instrument secured to the boiler, but owing to the flexibility provided by the use of cable guides, the instrument may be disposed in any other convenient location where it is visible at all times to the engineer.

I claim:

1. The combination with the operating gear for the cut-off of a steam engine of a housing, a cam within the housing movable to different positions, a pinion connected to the cam, a rack engaging the pinion and mounted for adjustment in a plane at an angle to the axis of rotation of the pinion, a connection between the rack and the reverse lever of the engine, a movable needle disposed at a distance from the housing, and means connected to the needle for moving the latter to different positions determined by the position of rest of the cam.

2. The combination with the operating gear for the cut-off of a steam engine of a housing, a cam within the housing, a shaft on which the cam is mounted, a pinion on the shaft, a rack engaging the pinion, a connection between the rack and the reverse lever of the engine, means for supporting the rack in contact with the pinion adjustable in a plane at an angle to the shaft, a movable needle, and means connected to the needle and actuated by the cam for moving the needle to different positions determined by the position of rest of the cam.

3. The combination with the operating gear for the cut-off of a steam engine of a housing, a slide within the housing, a movable needle, a connection between the needle and the slide whereby the needle occupies different positions of rest determined by the position of the slide, a cam within the housing engaging the slide, rack and pinion means for actuating the cam, a casing for the said rack and pinion means connected to the housing and adjustable with relation thereto, and a connection from the rack to the reverse lever of the engine.

4. The combination with the operating gear for the cut-off mechanism of a steam engine of a housing, a cam mounted within the housing for oscillation, a shaft mounted in the wall of the housing to carry the cam, this shaft having a portion extending beyond the housing wall, a pinion on the said portion of the shaft, a rack engaging the pinion, a casing enclosing the rack and pinion attached to the housing and adjustable with respect thereto at right angles to the axis of said shaft, a movable needle at a distance from the housing, a connection between the cam and the needle such that the needle occupies different positions of rest determined by the position of rest of the cam, and a connection between the rack and the reverse lever of the engine.

5. The combination with the operating gear for the cut-off of a steam locomotive of a housing, a shaft mounted in the wall of the housing having a portion outside the housing, a cam mounted on the shaft within the housing, a movable needle at a distance from the housing, means connected to the needle and actuated by the cam whereby the needle occupies different positions of rest determined by the position of rest of the cam, a pinion disposed on the shaft outside the housing, a rack engaging the pinion and movable to cause the rotation of the pinion and the oscillation of the cam, a casing enclosing the pinion and the rack, and a connection extending from the rack through the wall of the casing and leading to the tumbling shaft of the locomotive.

6. The combination with the operating gear for the cut-off of a steam locomotive of a housing disposed adjacent the tumbling shaft, a cam within the housing, a movable needle in the cab of the locomotive, a connection between the cam and the needle such that the needle assumes positions of rest determined by the position of the cam within the housing, a pinion connected to the cam, a rack connected to the pinion, means for supporting the rack in contact with the pinion, the said means being adjustable in a plane at an angle to the axis of rotation of the pinion, and a connection between the rack and the tumbling shaft of the locomotive.

7. In apparatus of the type described, the combination of a movable needle, a cam, a connection between the needle and the cam such that the needle occupies different positions of rest determined by the position of rest of the cam, a pinion connected to the cam, a rack engaging the pinion and connected to the tumbling shaft of the locomotive, and means for supporting the rack in engagement with the pinion adjustable in a plane at an angle to the axis of rotation of the pinion.

8. The combination with the operating gear for the cut-off of a locomotive of a movable needle, a cam, a connection between the needle and the cam operable to move the needle to different positions determined by the position of the cam, a pinion connected to the cam, a rack engaging the pinion, and a connection between the rack and the tumbling shaft of the locomotive including a block secured to the tumbling shaft and a pivotal connection between the block and the rack.

9. The combination with the operating gear for the cut-off of a locomotive of a movable needle in the cab of the locomotive, a cam mounted for oscillation adjacent the said operating gear, a connection between the cam and the needle operable to move the needle to different positions of rest determined by the position of rest of the cam, a block secured to the tumbling shaft, and a connection between the block and the cam, including a rack and pinion, the rack being pivotally connected to the block.

10. The combination with the operating gear for the cut-off of a locomotive of a movable needle, a cam mounted for oscillation, a connection between the needle and the cam operable to move the needle to different positions of rest determined by the position of rest of the cam, a pinion connected to the cam, a block mounted on the tumbling shaft and including a pair of arms partially embracing the said shaft, a rack meshing with the pinion, and a rod connected to the rack and pivotally secured to the said block.

11. The combination with the operating gear for the cut-off of a locomotive of a movable needle within the cab of the locomotive, a cam adjacent the said operating gear, a rack and pinion connection between the cam and the tumbling shaft of the locomotive, and a connection between the needle and the cam operable to move the needle to different positions of rest determined by the position of rest of the cam and including an enclosed conduit, a cable within the conduit, and a plurality of guides mounted as parts of the conduit, each including a sheave for the cable, and a two-part housing for the sheave, these parts being connected to the conduit and being relatively adjustable.

12. The combination with the operating gear for the cut-off of a locomotive, of a movable needle, a cam, a connection between the needle and the cam operable to move the needle to different positions determined by the position and contour of the cam, and means actuated by the tumbling shaft of the locomotive for moving the cam as the tumbling shaft is adjusted to different positions including a block attached to the tumbling shaft and a forked rod straddling and pivotally connected to the block.

13. The combination with the operating gear for the cut-off of a locomotive, of a movable needle, a cam, a connection between the needle and the cam operable to move the needle to different positions determined by the position and contour of the cam, and means actuated by the tumbling shaft of the locomotive for moving the cam as the tumbling shaft is adjusted to different positions including a block, means carried by the block engaging the tumbling shaft for attaching the block thereto, and a rod operatively connecting the block and the cam.

14. The combination with the operating gear for the cut-off of a locomotive, of a movable needle, a cam, a connection between the needle and the cam operable to move the needle to different positions determined by the position and contour of the cam, and means actuated by the tumbling shaft of the locomotive for moving the cam as the tumbling shaft is adjusted to different positions including a block, means projecting from the block and partially encircling the tumbling shaft for attaching the block thereto, and a rod operatively connected to the cam and pivotally attached to the block.

15. The combination with the operating gear for the cut-off of a locomotive, of a movable needle, a cam, a connection between the needle and the cam operable to move the needle to different positions determined by the position and contour of the cam, and means actuated by the tumbling shaft of the locomotive for moving the cam as the tumbling shaft is adjusted to different positions including a block, a pair of straps on the block partially encircling the tumbling shaft and attached thereto, and an operative connection between the block and the cam.

16. In a device of the type described, the combination with the tumbling shaft of a steam engine of a two-part block, means carried by one of said parts for attaching the block to said shaft, an adjustable connection between the parts of the block, and means connected to the second part of the block for transmitting the movement of said part, produced by adjustment of the tumbling shaft, to a point remote from said shaft.

17. In a device of the type described, the combination with the tumbling shaft of a steam engine of a block mounted fast on the shaft and having a part adjustable with reference to the shaft, and means connected to said adjustable part for transmitting the movement of the shaft to a point remote therefrom.

18. The combination with the operating gear for the cut-off of a steam engine, of a movable needle, a housing, a member within the housing connected to the needle, a connection between the member and a part of the operating gear transmitting movement to the member as the operating gear is actuated to vary the cut-off, and a casing enclosing a part of the connection and adjustable with relation to the housing to permit movement to be freely transmitted to said members.

In testimony whereof I affix my signature.

VIRGINIUS Z. CARACRISTI.